United States Patent [19]

Comer

[11] Patent Number: 4,477,152

[45] Date of Patent: Oct. 16, 1984

[54] REDUCTION OF SIGNAL MODULATION CAUSED BY POLARIZATION IN VISIBLE OPTICAL SCANNING SYSTEMS

[75] Inventor: Matthew R. Comer, Pasadena, Md.

[73] Assignee: The United States of America as represented by the Secretary of the Air Force, Washington, D.C.

[21] Appl. No.: 382,068

[22] Filed: May 26, 1982

[51] Int. Cl.³ .......................... G02F 1/01; G02B 27/28
[52] U.S. Cl. ..................... 350/394; 350/397; 350/403; 350/406
[58] Field of Search ............... 350/394, 395, 397, 401, 350/403, 406, 6.5, 370

[56] References Cited

U.S. PATENT DOCUMENTS

| | | | |
|---|---|---|---|
| 2,868,076 | 1/1959 | Geffcken et al. | 88/65 |
| 3,496,483 | 2/1970 | Max et al. | 350/394 |
| 3,508,809 | 4/1970 | Wilber et al. | 350/157 |
| 3,778,153 | 12/1973 | Iki | 355/66 |
| 3,801,180 | 4/1974 | McGuire et al. | 350/7 |
| 3,841,753 | 10/1974 | Ogawa | 355/8 |
| 3,935,444 | 1/1976 | Zechnall et al. | 240/9.5 |
| 4,084,883 | 4/1978 | Eastman et al. | 350/152 |
| 4,252,410 | 2/1981 | Jain | 350/370 |

Primary Examiner—Bruce Y. Arnold
Assistant Examiner—William Propp
Attorney, Agent, or Firm—Donald J. Singer; Jacob N. Erlich

[57] ABSTRACT

A method of and apparatus for minimizing the polarization modulation effect of an optical scanner system which is in earth orbit and is scanning the earth, where the optical train of the scanner includes a plurality of optically aligned, rotatable, flat folding mirrors having incident angle normals in the same plane, with the mirrors serially reflecting an image acquired by the scanning of the system in orbit. The method includes the steps of rotating the most rearwardly disposed of the mirrors around its vertical geometric axis such that the reflecting surface of the mirror is perpendicular to the impinging image beam, and then rotating the mirror around its horizontal geometric axis such that the angle of incidence of the impinging image beam is of a preselected magnitude. This change in positional relationship results in a novel apparatus which minimizes the aforesaid polarization modulation effect.

7 Claims, 8 Drawing Figures

REDUCTION OF SIGNAL MODULATION CAUSED BY POLARIZATION IN VISIBLE OPTICAL SCANNING SYSTEMS

STATEMENT OF GOVERNMENT INTEREST

The invention described herein may be manufactured and used by or for the Government for governmental purposes without the payment of any royalty thereon.

BACKGROUND OF THE INVENTION

The instant invention relates to polarization modulation and, more particularly, to the significant reduction of the effect of this phenomenon in earth orbiting scanning systems.

In earth observing satellite systems having an optical scanning assembly operably associated with a radiometer (or other detector), the radiometer (or other detector) will be adversely affected by scene polarization if the scanner is polarization sensitive.

Some optical scanning earth observing systems use folding mirrors (i.e., mirrors which fold the optical path) in the optical train, and therefore are polarization sensitive. It is these mirrors and their reflective coatings which cause a polarization problem. These mirrors constitute an analyzer, if the scene being viewed is polarized; and, scene polarization can occur when the scanner is viewing earth scenes which include clouds, or ice, or fog, or water, and the like. The polarized scene becomes the polarizer, and cross polarization occurs. As a result, unwanted amplitude modulation of the received signal (i.e., the beam of the image) occurs.

The simple solution is to add a depolarizer in the optical train of the scanner. However, no depolarizer presently exits that would be practical for such an optical system operating in orbit.

It is the reflecting surfaces of the folding mirror which make the scanner polarization sensitive. In this regard it is to be noted that the coatings most commonly used to make the mirror surfaces reflective are aluminum and silver. Test results establish that, on the average, aluminum mirrors polarize about thre times that of the silver mirrors. More specifically, in a folding mirror assembly which consists of three mirrors, such as will be discussed later herein, the signal modulation may vary as much as 6 percent if the reflective coatings are of aluminum, and as much as 1.5 percent if the reflective coatings are of silver. In a folding mirror assembly which consists of four mirrors, such as will be discussed later herein, the signal modulation may vary as much as 9 percent if the reflective coatings are of aluminum, and as much as 2 percent if the reflective coatings are of silver.

Additionally, these optical scanning systems typically are designed such that the normals (of the angles of incidence and reflection) to the reflecting surfaces of the mirrors are in the same plane. Unfortunately, this restraint adds to polarization, since the polarization is additive, as will be shown later herein.

As a result of all of the foregoing, the crossed polarization effect occurs, and the radiometer (or other detector) sees unwanted sinusoidal signal modulation.

Accordingly, what is needed in the art and is not presently available is some way to minimize the polarization modulation effect of these optical scanning systems that have a plurality of optically aligned, rotatable, flat folding mirrors which have incident angle normals in the same plane, which have aluminum or silver coated reflecting surfaces, and which serially reflect an image acquired by the scanning system while in orbit.

SUMMARY OF THE INVENTION

The instant invention fulfills the aforementioned need, and thereby constitutes a significant advance in the state-of-the-art, by providing a unique method of, and apparatus for, substantially reducing the undesirable polarization modulation effect hereinbefore discussed.

Briefly stated, and oversimplified, the method comprises steps which cause the rotation of the image acquired by the scanning of the optical system and reflected by the folding mirrors in the optical train of the scanner.

Accordingly, it is an object of the instant invention to effectuate the substantial reduction of the polarization modulation effect resulting from the use of folding mirrors in prior art earth orbiting optical scanners.

It is another object of this invention to attain the aforesaid substantial reduction of the polarization modulation effect without changing the coatings of the surfaces of the folding mirrors.

It is still another object of the instant invention to achieve the foregoing objects without replacing the folding mirrors.

It is a further object of this invention to provide a method of, and an apparatus for, accomplishing all of the above easily, quickly, and reliably.

These objects of the instant invention, as well as other objects related thereto, will become readily apparent after a consideration of the description of the instant invention, together with reference to the contents of the Figures of the drawing.

DESCRIPTION OF THE INVENTION

Figure 1:
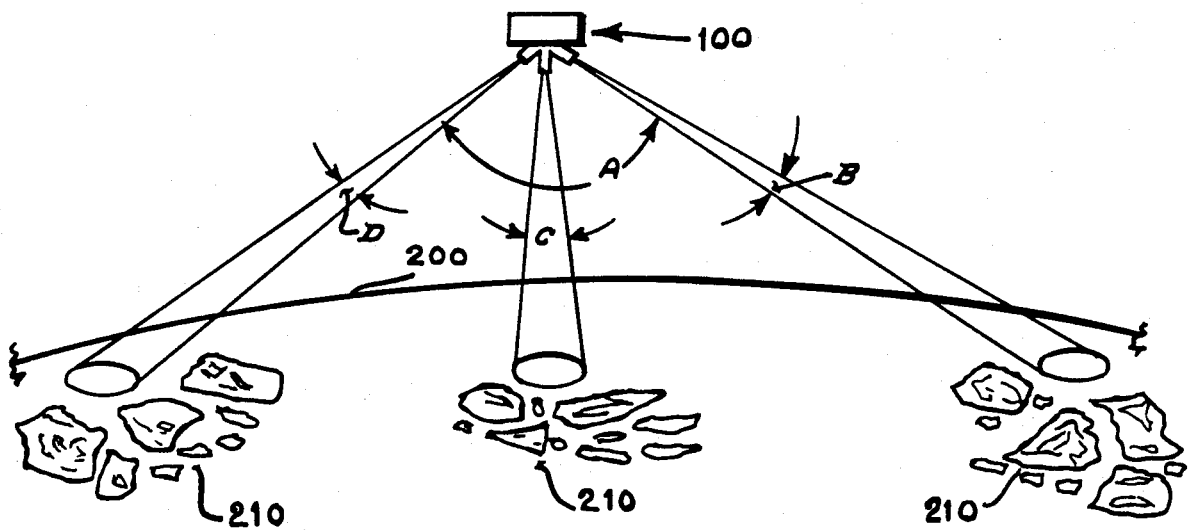
FIG. 1 is a representation, in simplified pictorial and schematic form, of an earth observation satellite optical scanner while in orbit around the earth and scanning scenes thereof.

With reference to FIG. 1, therein is shown a representative typical earth observation satellite optical scanner 100 while in orbit around the earth 200. The scanner 100 has a wide scan angle A and instantaneous fields of view, such as B, C and D. Also shown in FIG. 1 are representations of polarization causing natural elements, all similarly designated 210, such as clouds, ice, fog, water and the like.

Figure 2:
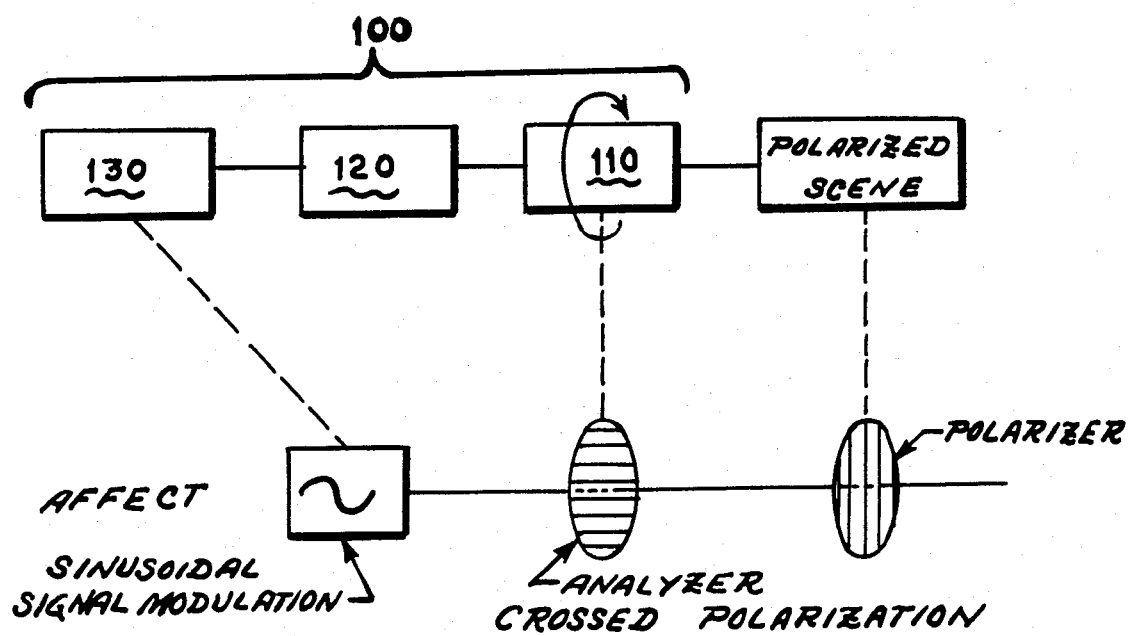
FIG. 2 is a schematic representation of a typical prior art folding mirror scanning assembly, and the operably associated components, of the earth observation satellite optical scanner shown in FIG. 1, coupled with a schematic representation of the result of the use of the scanner.

Now, with reference to FIG. 2, therein is shown in a schematic representation some of the components of a typical earth observation satellite optical scanner 100. These components include, but are not limited to, the collector and the assembly of folding mirrors 110, the radiometer or other detector 130, and the relay 120 therebetween, all of which are operably associated. Also shown in FIG. 2 is a representation of the result of the use of this scanner 200, i.e., if the collector and folding mirrors 110 see a polarized scene, then the folding mirrors 110 become the analyzer, the scene becomes the polarizer, cross polarization occurs, and the radiometer or other detector 130 sees an unwanted sinusoidal signal modulation.

Figure 3:
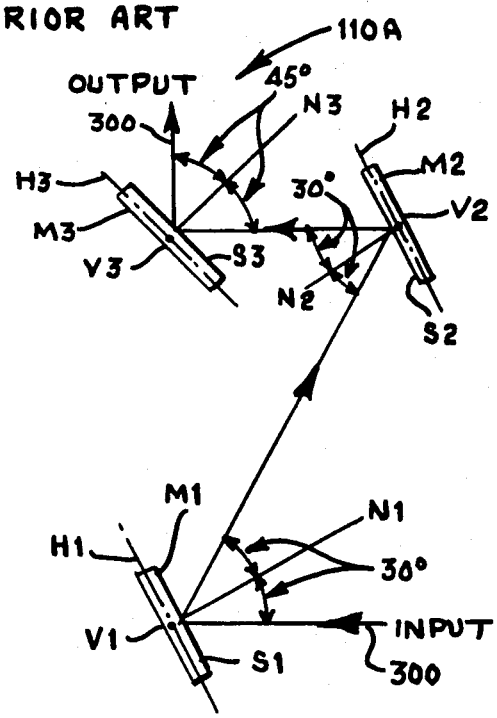
FIG. 3 is a top view, in simplified schematic and pictorial form, of a prior art folding mirror scanning assembly while receiving and reflecting an acquired image, wherein the assembly has three folding mirrors.
Figure 4:
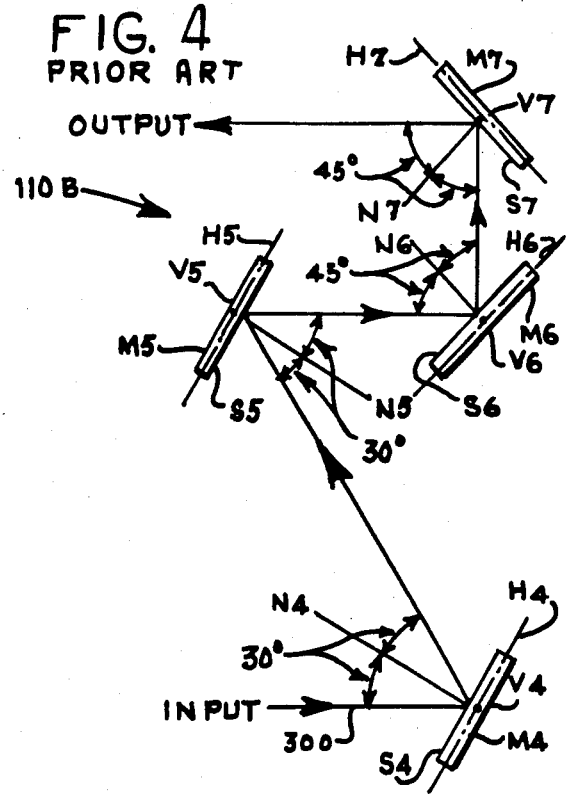
FIG. 4 is a top view, in simplified schematic and pictorial form, of another prior art folding mirror scanning assembly while receiving and reflecting an acquired image, wherein the assembly has four folding mirrors.

With reference to FIGS. 2, 3 and 4, it is to be understood that the typical prior art assembly of folding mirrors 110, FIG. 2, may comprise pluralities of a different member of folding mirrors. An assembly 110A of three folding mirrors, such as M1, M2 and M3, is shown in FIG. 3; and, an assembly 110B of four folding mirrors, such as M4, M5, M6 and M7, is shown in FIG. 4. These assemblies 110A and 110B, and their constituent folding mirrors, are shown in FIGS. 3 and 4, respectively, in top plan views. It is to be noted that the folding mirrors in each typical assembly, such as 110A and 110B are optically aligned, rotatable, flat, and serially reflect the image 300 acquired by the scanner 100, FIG. 1, from input to output. The mirrors M1-M7, inclusive, have reflective surfaces S1-S7, respectively, and also have horizontal and vertical geometric axes which are perpendicular to each other, with the horizontal geometric axes being designaled H1-H7, respectively, and the vertical axes being designaled V1-V7, respectively.

It is here also to be noted that, in the interest of maintaining simplicity of the Figures of the drawing, the beam 300 which constitutes the acquired and reflective image is indicated as a single line rather than a plurality of lines. The image beam 300 impinges upon mirror M1 such that the angle of incidence and the angle of reflection are 30 degrees each, with normal N1 (hereinafter referred to as an "incident angle normal") therebetween. Similarly, mirror M2 has incidence/reflection angles of 30 degrees and incident angle normal N2; M3 has incidence/reflection angles of 45 degrees and incident angle normal N3; M4 has incidence/reflection angles of 30 degrees and incident angle normal N4; M5 has incidence/reflection angles of 30 degrees and incident angle normal N5; M6 has incidence/reflection angles of 45 degrees and incident angle normal N6; and M7 has incidence/reflection of 45 degrees and incident angle normal N7. The normals (i.e., incident angle normals) N1-N3, FIG. 3, of mirrors M1-M3, respectively, are in the same plane. Similarly, the normals (i.e., the incident angle normals) N4-N7, FIG. 4, of mirrors M4-M7 are in the same plane.

Figure 5:
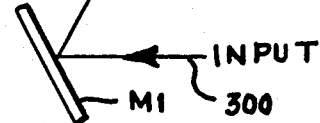
FIG. 5 is a top view, in simplified schematic and pictorial form, of the inventive apparatus and also of the result of practising the steps of the inventive method with the three mirrors shown in FIG. 3.

With reference to FIG. 5, therein is shown, in a view similar to that of FIG. 3, the result of practising the steps of the inventive method with the three mirrors M1, M2 and M3 of the typical representative assembly 110A which is shown in FIG. 3.

Since the characteristics of these mirrors, and their respective positioned relationship to each other and to image beam 300, have already been explained in detail herein, these matters will not be repeated here.

It is to be noted, however, that the essence of the result of practising the steps of the inventive method is the changed orientation of the mirror M3, the mirror optically aligned farthest away from input image beam 300. At this point it is suggested that the reader compare the orientation of mirror M3 in FIG. 5 with the previous orientation of that mirror in FIG. 3.

Again with reference to FIG. 5, the instant inventive method comprises essentially the following steps.

Firstly, rotating mirror M3 around its vertical geometric axis V3, such that the reflecting surface S3 of mirror M3 is perpendicular to the impinging image beam 300 which is reflected by mirror M2.

Then, rotating the rotated mirror M3 around its horizontal geometric axis H3, such that the angle of incidence is of a preselected magnitude. In this situation, the preselected magnitude of the angle of incidence is 45 degrees, as is best seen in FIG. 7, which is the view of newly reoriented mirror M3 as seen when viewed along line 7—7 of FIG. 5.

Figure 7:
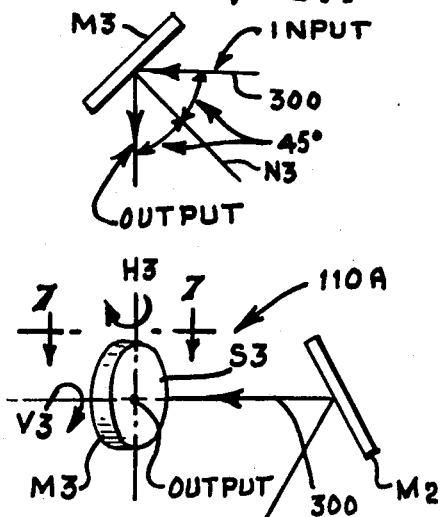
FIG. 7 is the view, in simplified schematic and pictorial form as seen along line 7—7 in FIG. 5.

As can be seen in FIG. 5, the image beam 300 is in the plane of the paper while impinging the reflecting surface 53 of mirror M3 and forming an incidence angle; and, as can be seen in FIG. 7 and can be visualized by viewing FIG. 5, the reflected image beam 300 is "emerging" from the plane of the paper and is directed toward the reader. More specifically, the reflected image beam 300 is "emerging" from the plane of the paper and is perpendicular to the plane of the paper.

This new orientation of mirror M3, FIGS. 5 and 7, results in the inventive apparatus and in the re-direction of image beam 300 and the minimizing of the polarization modulation effect of the assembly 110A when that assembly is used in an earth observing optical scanning system while in orbit around the earth and viewing scenes which include clouds, or ice, or fog, or water, or the like. More specifically, this new orientation of miror M3 reduces the polarization of the assembly 110A from approximately the 6 percent previously mentioned to approximately 0.8 percent if the mirrors M1, M2 and M3 are aluminum surfaced, and from approximately the 1.5 percent previously mentioned to approximately 0.0 percent if the mirrors M1, M2 and M3 are silver surfaced.

Figure 6:
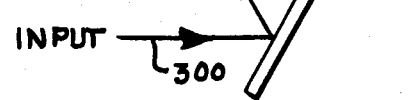
FIG. 6 is a top view in simplified schematic and pictorial form, of the inventive apparatus and also of the result of practising the steps of the inventive method with the four mirrors shown in FIG. 4.

Now, with reference to FIG. 6, therein is shown in a view similar to that of FIG. 4, the result of practising the steps of the inventive method with the mirrors M4, M5, M6 and M7 of the typical representative assembly 110B which is shown in FIG. 4.

The characteristics of these mirrors, and their respective positional relationship to each other and to the image beam 300, have already been explained in detail and will not be repeated here.

Similar to the situation with assembly 110A, FIGS. 3, 5 and 7, the essence of the result of practising the steps of the inventive method with assembly 110B is the changed orientation of the mirror M7, which is the mirror optically farthest away from the input beam 300. It is here suggested that the reader compare the orientation of mirror M7 in FIG. 6 with the previous orientation of that mirror in FIG. 4.

Again with reference to FIG. 6, the instant inventive method comprises the following steps.

Firstly, rotating mirror M7 around its vertical geometric axis V7, such that the reflecting surface S7 of mirror M7 is perpendicular to the impinging image beam 300 which is being reflected by mirror M6.

Then, rotating the rotated mirror M7 around its horizontal geometric axis H7, such that the angle of incidence is of a preselected magnitude. In this situation, the preselected magnitude of the angle of incidence is 60 degrees, as is best seen in FIG. 8, which is the view of the newly oriented mirror M7 as seen when viewed along line 8—8 in FIG. 6.

Figure 8:
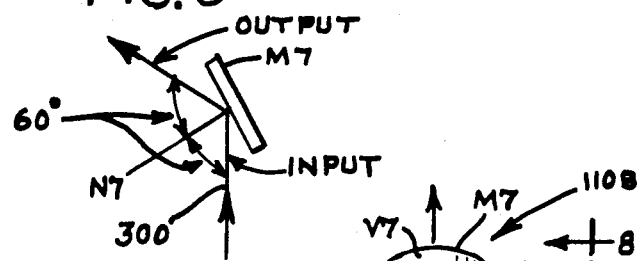
FIG. 8 is the view, in simplified schematic and pictorial form, as seen along line 8—8 in FIG. 6.

As can be seen in FIG. 6, the image beam 300 is in the plane of the paper while impinging the reflecting surface S7 of the mirror M7 and forming an incidence angle; and, as can be seen in FIG. 8 and can be visualized by viewing FIG. 6, the reflected image beam 300 is "emerging" from the plane of the paper and is directed toward the reader, but not perpendicularly to the plane of the paper.

This new orientation of mirror M7, FIGS. 6 and 8, results in the inventive apparatus and in the re-direction of image beam 300 and the minimizing of the polarization modulation effect of the assembly 110B when that assembly is used in an earth observing optical scanning system while in orbit around the earth and viewing scenes which include clouds, or ice, or fog, or water, or the like. More specifically, this new orientation of mirror M7 reduces the polarization of the assembly 110B from approximately the 9 percent previously mentioned to approximately 0.0 percent if the mirrors M4–M7, inclusive, are aluminum surfaced, and from approximately the 2 percent previously mentioned to approximately 0.0 percent if the mirrors M4–M7, inclusive, are silver surfaced.

CONCLUSION

It is abundantly clear from all of the foregoing, and from the contents of the Figures of the drawing, that the stated objects (as well as objects related thereto) of the instant invention have been achieved.

It is to be noted that, although there have been described and shown the fundamental and unique features of the invention apparatus, as applied to two embodiments (i.e., one as shown in FIG. 5 and 7, and the other as shown in FIGS. 6 and 8), nevertheless other embodiments may occur to and can be made by those of ordinary skill in the art.

Additionally, because of the teachings herein, it may occur to others of ordinary skill in the art that, in appropriate particular circumstances, the number of the basic and fundamental steps of my inventive method can be increased, decreased, or otherwise varied, and/or that their sequence can be changed. In this regard it is to be noted that, in spite of any variations of the steps of the instant inventive method, the same desired and already-attained results will be obtained.

What is claimed is:

1. A method of minimizing the polarization modulation effect of an optical scanner system which is in earth orbit and is scanning the earth wherein said system includes a plurality of optically aligned rotatable flat folding mirrors having incident angle normals in the same plane, said plurality of rotatable flat folding mirrors being optically aligned with one another from closest to an input image beam to furthest away from said input image beam, with said mirrors serially reflecting said image beam acquired by the scanning of said system in orbit, said method comprising the steps of:
   a. rotating the one of said flat folding mirrors optically aligned furthest away from said input image beam around its vertical geometric axis, such that the reflecting surface of said one flat folding mirror is perpendicular to said image beam impinging thereon; and
   b. thereafter, rotating said one flat folding mirror around its horizontal geometric axis, such that the angle of incidence of said impinging image beam is of a preselected magnitude;
   whereby the polarization modulation effect caused by the scanning of said optical system while in earth orbit is minimized.

2. A folding mirror assembly comprising a plurality of optically aligned rotatable flat folding mirrors having incident angle normals in the same plane, with said mirrors serially reflecting an acquired image, wherein said assembly consists of:
   a. a first mirror disposed and folded such that the beam of said acquired image impinges upon the reflective surface of this mirror at an incidence angle of 30 degrees and is reflected;
   b. a second mirror optically aligned with said first mirror and folded such that said image beam reflected by said first mirror impinges upon the reflective surface of said second mirror at an incidence angle of 30 degrees and is reflected; and
   c. a third mirror optically aligned with said second mirror and folded such that said image beam reflected by said second mirror impinges upon the reflective surface of said third mirror at an incidence angle of 45 degrees and is reflected, and wherein said third mirror has been rotated around its vertical geometric axis, such that the reflecting surface of this mirror is perpendicular to the impinging image beam reflected by said second mirror and also wherein said third mirror has been then rotated around its horizontal geometric axis, such that the angle of incidence of said impinging image beam is of a magnitude of 45 degrees.

3. A folding mirror assembly comprising a plurality of optically aligned rotatable flat folding mirrors having incident angle normals in the same plane, with said mirrors serially reflecting an acquired image, wherein said assembly consists of:
   a. a first mirror disposed and folded such that the beam of said acquired image impinges upon the reflective surface of this mirror at an incidence angle of 30 degrees and is reflected;
   b. a second mirror optically aligned with said first mirror and folded such that said image beam reflected by said first mirror impinges upon the reflective surface of said second mirror at an incidence angle of 30 degrees and is reflected;
   c. a third mirror optically aligned with said second mirror and folded such that said image beam reflected by said second mirror impinges upon the reflective surface of said third mirror at an incidence angle of 45 degrees and is reflected; and
   d. a fourth mirror optically aligned with said third mirror and folded such that said image beam reflected by said third mirror impinges upon the reflective surface of said fourth mirror at an incidence angle of 45 degrees and is reflected, and wherein said fourth mirror is rotated around its vertical geometric axis, such that the reflecting surface of this mirror is perpendicular to the impinging image beam reflected by said third mirror, and also wherein said fourth mirror also has been rotated around its horizontal geometric axis, such that the angle of incidence of said impinging image beam is of a magnitude of 60 degrees.

4. A folding mirror assembly, as set forth in claim 2, wherein the reflective surface of each said mirror is aluminum coated.

5. A folding mirror assembly, as set forth in claim 2, wherein the reflective surface of each said mirror is silver coated.

6. A folding mirror assembly, as set forth in claim 3, wherein the reflective surface of each said mirror is aluminum coated.

7. A folding mirror assembly, as set forth in claim 3, wherein the reflective surface of each said mirror is silver coated.

* * * * *